July 17, 1962  W. R. WICKERHAM  3,045,162
CRANE CONTROL
Filed Dec. 10, 1956  6 Sheets-Sheet 3

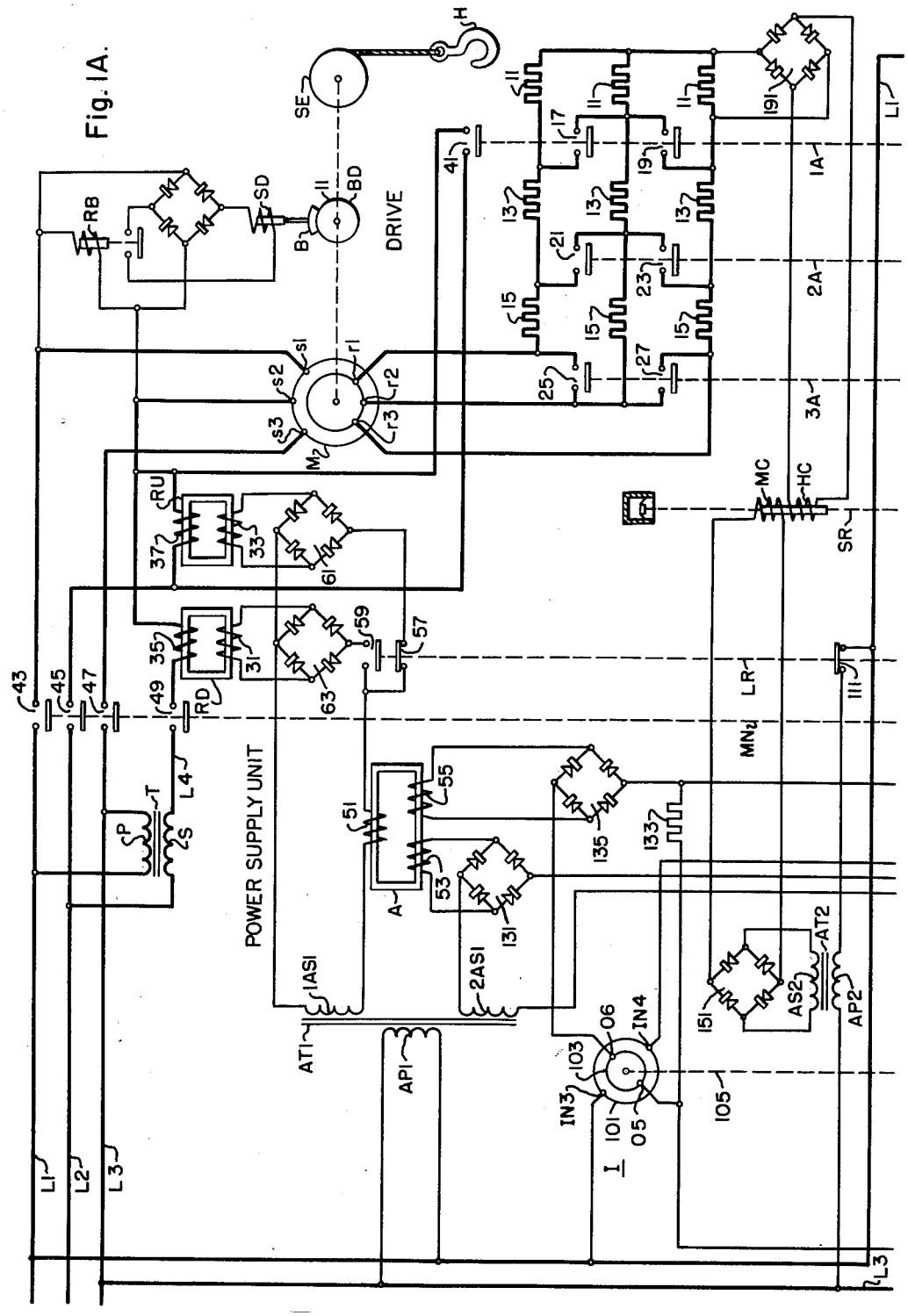
Fig. IA.

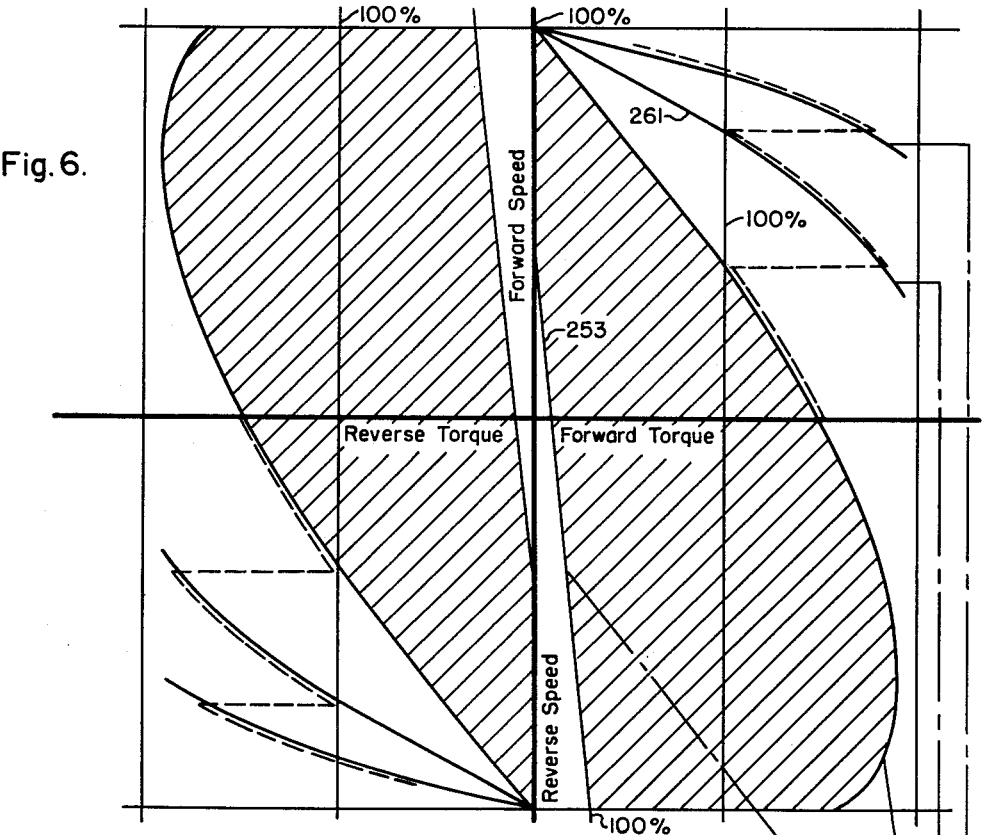
Fig. 6.
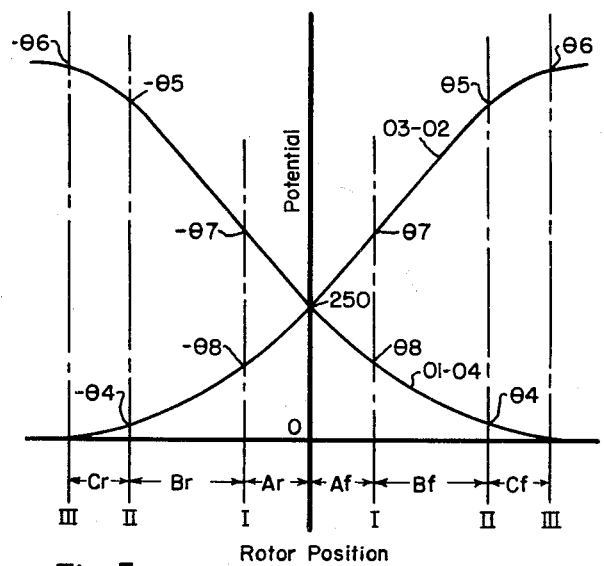
Fig. 5.
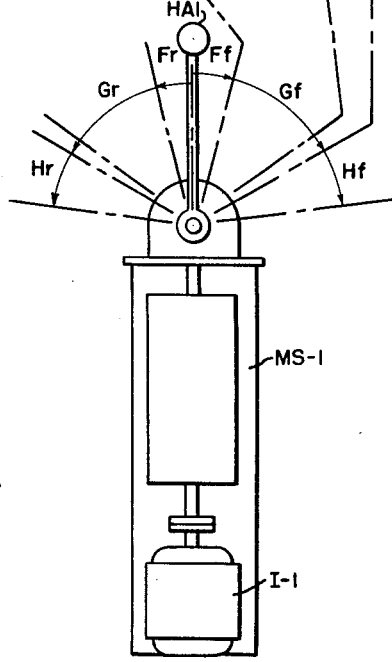

3,045,162
CRANE CONTROL
William R. Wickerham, Buffalo, N.Y., assignor to Westinghouse Electric Corporation, East Pittsburgh, Pa., a corporation of Pennsylvania
Filed Dec. 10, 1956, Ser. No. 627,486
17 Claims. (Cl. 318—202)

This invention relates to electric motor drives and control for such drives, and has particular relationship to drives for hoists or cranes and for loads related to hoists, such as crane bridges, crane trolleys, drawbridges and the like. This application is a continuation-in-part of Patent 2,774,923, granted December 18, 1956, for Electric Control for Alternating Current Motor, and assigned to Westinghouse Electric Corporation.

It is necessary that the speed and direction of movement of hoists and like apparatus be precisely controllable over a wide range. Thus, so that an operator may be able to position a crane properly for an operation and carry out the operation it is essential that he be able to readily move the crane hook up and down. It is also essential that once a load is being hoisted the application of excessive torque be avoided because such torque might damage the crane. To accomplish these objects drives for hoists and related apparatus in accordance with the teachings of the prior art are highly involved both in their structure and in their operation including a large number of control components interrelated in a complex manner. Thus, a prior art control includes a weighing mechanism and a tachometer both interconnected with the drive motor so as to regulate its operation. While this apparatus operates highly satisfactorily, it is of high cost because of its complexity and for the same reason its maintenance is costly.

It is accordingly broadly an object of this invention to provide a drive for hoists and related apparatus which shall operate with precision and nevertheless shall be of relatively simple and low-cost structure.

Another object of this invention is to provide a drive for hoists and related apparatus in which the speed and torque of the drive motor shall be steplessly controllable over a large portion of the control range of the motor.

A specific object of this invention is to provide a drive for hoists which shall be steplessly controllable over critical portions both of the hoist range and of the lowering range.

A further specific object of this invention is to provide novel apparatus of simple and low-cost structure for driving a load, such as the bridge or trolley of a crane, for example, which is moved in a forward or in a reverse direction, and which shall in spite of its low cost and simplicity include facilities for varying the speed-torque characteristic of the drive motor steplessly over a large portion of the range of operation of the motor both in a forward and in a reverse direction.

An incidental object of this invention is to provide a drive for hoists and related apparatus of relatively simple structure which shall under certain critical circumstances operate in response to the load imposed on the drive motor.

Another incidental object of this invention is to provide a novel control circuit particularly suitable for use in the control of a drive for hoists and related apparatus.

A further incidental object of this invention is to provide a novel relay circuit particularly suitable for use in the control of a drive for hoists and related apparatus.

An ancillary object of this invention is to provide a novel master switch combination particularly suitable for use in the driving and control of hoists and the like.

This invention concerns itself principally with drives for hoists and like apparatus which includes controllable reactors, as disclosed in the parent patent in circuit with the drive motor. The impedance of these reactors at any control setting or control point determines the speed-torque characteristic and the direction of rotation of the drive motor. Such apparatus also includes a controlling inductor of continuously variable output for controlling the impedance of the controllable reactors. This controlling inductor includes a stator supplied with alternating current and a rotor, the angular position of which determines the output of the controlling inductor. The mode of operation of control apparatus of this type is set by a master switch having a plurality of discrete positions each of which sets a control point or setting for the control apparatus.

In accordance with this invention, the handle of the control switch is coupled or otherwise connected to the rotor of the inductor so that the rotor is rotated by moving the handle of the control switch. The rotor may then be moved steplessly from one position to the adjacent one over a continuum of positions and the output of the inductor and the impedances of the reactors may thus be steplessly varied between discrete settings of the control switch. Thus, this control apparatus may be set to operate over a continuum of control points, and the motor may be set steplessly to operate along continuously and steplessly, changing speed-torque characteristics. Precise control of the motor is then achieved, in a simple manner and at relatively low cost.

In accordance with the broader aspects of this invention the stepless control may be applied over the whole range of the control switch. But usually such control is most effective only over a portion of the range of the switch and in accordance with the preferred practice of this invention the rotor or the inductor is so operated by the control switch that substantially the whole output sweep of the inductor is concentrated in that portion of range where stepless control is most effective. Such control is peculiarly advantageous over the control on which the sweep is spread out over the whole range of operation of the switch.

In accordance with a further specific aspect of this invention, a novel reactor control circuit particularly suitable for controlling a drive for hoists and the like is provided. This circuit includes a pair of controlling reactors, the control windings of which are selectively supplied from the output winding of a single magnetic amplifier unit.

In accordance with a further aspect of this invention, a novel circuit responsive to the load on a motor and particularly suitable for use in a drive for hoists or the like apparatus is provided. This apparatus includes a relay with a making coil and a holding coil. In the practice of this invention, the making coil is maintained energized in the standby condition of the apparatus, and the holding coil is connected across the resistance in series with the rotor of the drive motor so that when the supply through the making coil is interrupted the holding coil is supplied with adequate current to hold the relay in actuated condition only if the load on the motor is above a predetermined magnitude. The relay controls the magnitude of the resistance in series with the rotor of the drive motor and permits it to be substantially reduced only if the load on the motor is substantially decreased, for example, by overhauling.

In accordance with still another aspect of the invention an inductor having two outputs in quadrature controls both reactors of a forward-reverse drive suitable for a bridge of a crane, for example. The inductor is so connected to the reactors that in any setting it decreases the impedance of one reactor and at the same time increases the impedance of the other, producing in effect, a push-pull operation.

The novel features considered characteristic of this invention are disclosed generally above. The invention itself, both as to its organization and its method of operation, together with additional objects and advantages thereof, will be understood from the following description of specific embodiments when read in connection with the accompanying drawings, in which:

FIGS. 1A and 1B together constitute a circuit diagram of a drive for a hoist in accordance with this invention;

FIG. 5 is a graph for the controlling inductor used in the practice of the embodiment of the invention shown in FIG. 4 in which the output potentials of the controlling inductor are plotted as a function of the rotor position;

FIG. 6 is a graph and a diagram illustrating the operation of the apparatus shown in FIG. 4;

DESCRIPTION—FIGS. 1A–1B

Figure 1B:
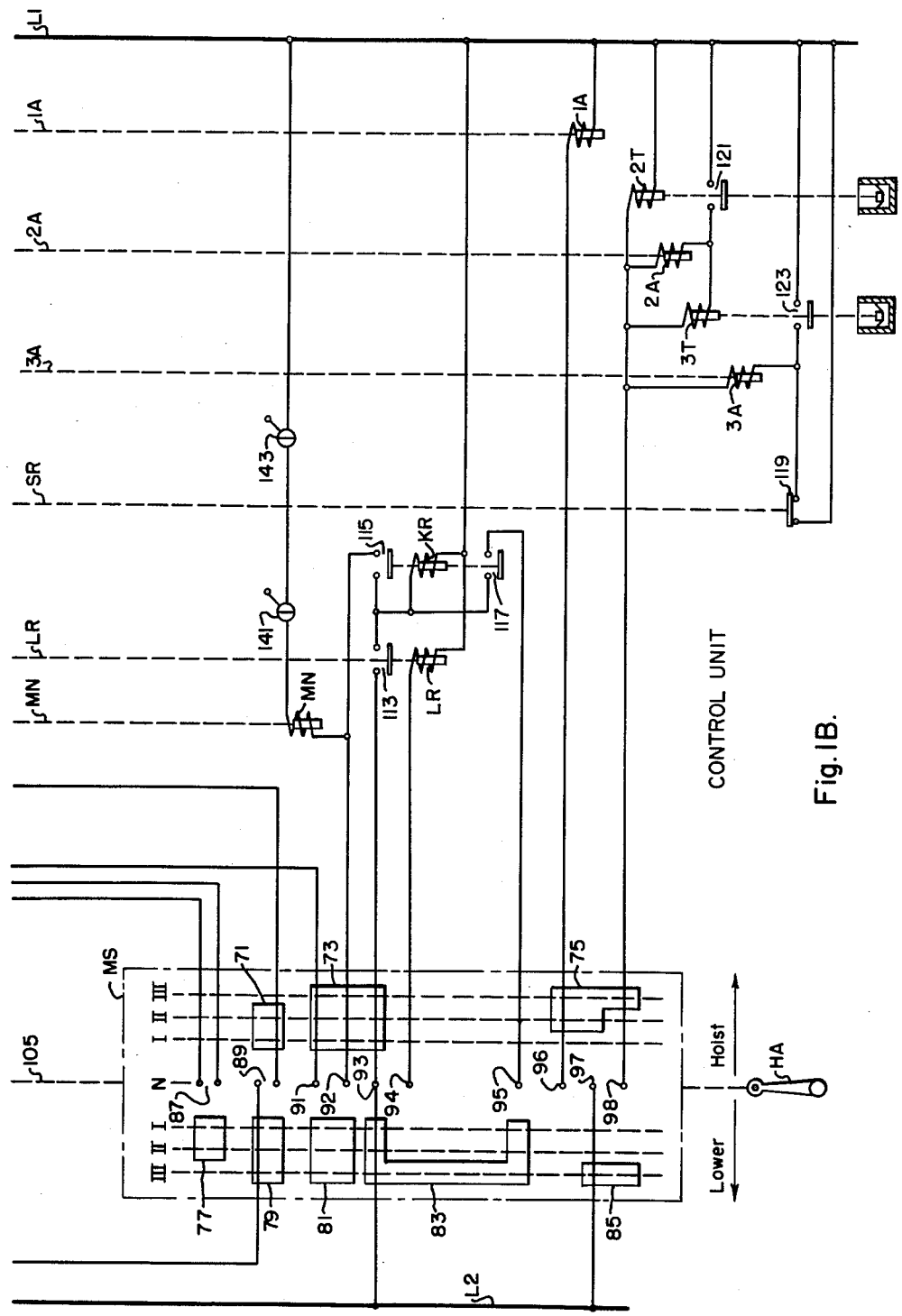

The apparatus shown in FIGS. 1A and 1B includes a Drive, a Power Supply Unit, and a Control Unit. This apparatus may be energized from a three-phase commercial power supply usually of the 220 or 440 volt type. The Drive includes a polyphase motor M having stator terminals $s1$, $s2$ and $s3$ and rotor terminals $r1$, $r2$ and $r3$. The motor M includes on its shaft a brake drum BD with which a brake B is associated and a sheave SE from which a hook H is suspended. The hook H is rotated by the motor M in one direction or the other to raise or lower a load suspended from the hook. In stand-by condition of the apparatus, the brake B is maintained engaged with the drum BD. During operation, the brake B may be electromagnetically disengaged from the drum by operation of a solenoid SD.

Sets of resistances 11, 13, 15 are connected across the secondary terminals $r1$, $r2$, $r3$ of the motor. These resistances are adapted to be shunted by closing normally open contacts 17 and 19, 21 and 23, and 25 and 27 of contactors 1A, 2A and 3A which are controlled from the Control Unit.

The Power Supply Unit comprises a duplex interconnected supply including conductors L1, L2 and L3 adapted to be connected to the buses of the commercial power supply and a conductor L4 which is supplied from the secondary S of a phase reversing transformer T, the primary P of which is connected between conductors L1 and L3. The Power Supply Unit also includes a pair of reactors RD and RU, each having a control winding 31 and 33 and an output winding 35 and 37. The output windings 35 and 37 of the reactors RD and RU have a common junction at one terminal, and this terminal is connected to the terminal $s2$ of the motor M. In addition, the output winding of reactor RU may be short-circuited by an additional contact 41 of contactor 1A.

The connection of the motor M and the output windings of inductors RD and RU to the supply conductors L1, L2, L3 and L4 is controlled by a contactor MN having a plurality of contacts 43, 45, 47, 49. When the contact MN is actuated, one of these contacts 43 connects conductor L1 directly to terminal $s1$ of motor M, another 45 connects conductor L2 to the remaining terminal of the reactor RU, a third 47 connects conductor L3 to terminal $s3$ of the motor M, and a fourth 49 connects conductor L4 to the remaining terminal of the reactor RD. Control current is supplied to the control windings of reactors RD and RU from a magnetic amplifier A having an output winding 51, a bias winding 53 and a control winding 55. The output winding 51 is supplied from the secondary 1AS1 of a transformer AT1 and the secondary 1AS1 and the winding 51 are adapted to be selectively connected through a normally open and a normally closed contact 57 and 59 of a relay LR in the Control Unit and through associated rectifiers 61 and 63 to the control windings 33 and 31 respectively of the reactors RD and RU.

The Control Unit includes a master switch combination including a switch MS and a controlling inductor I. The switch MS has a neutral position N, hoist positions I, II, III and lower positions I, II, III, and is actuable by a handle HA through these positions. The switch may also be set in any intermediate position between hoist positions I and II and between lower positions I and II, and the setting of this switch from one of these intermediate positions to the other may be accomplished steplessly. The master switch MS is of the drum type including a plurality of conducting segments 71, 73, 75, 77, 79, 81, 83, 85 and a plurality of sets of brushes 87, 89, 91, 92, 93, 94, 95, 96, 97 98. In the neutral position of the switch, the brushes are insulated from each other. In the different hoist or lower positions certain of the brushes are interconnected by the segments.

An inductor I suitable for the practice of the embodiment of this invention shown in FIGS. 1A and 1B is disclosed in detail in Patent 2,832,024 issued April 22, 1958 for Motor Control Apparatus and assigned to Westinghouse Electric Corportion. In this patent, the inductor is referred to as vernier unit IV. Briefly, such an inductor is made from a repulsion-start induction-run motor from which the commutator and brush rigging is omitted. The inductor then has a stator 101 which may have input terminals IN3 and IN4 and a rotor 103 which may have output terminals O5 and O6. A mechanical connection 105 from the rotor is brought out so that it may be rotated manually.

When alternating potential is impressed between the input terminals IN3 and IN4, an alternating potential is produced across the output terminals O5 and O6, the magnitude of which depends on the setting of the rotor. The rotor 105 is mechanically connected to the handle HA of the master switch MS so that its position is determined by the position of the handle; as the handle is rotated, it rotates the rotor, thus changing the magnitude of the potential output between the terminals O5 and O6.

Figure 2:
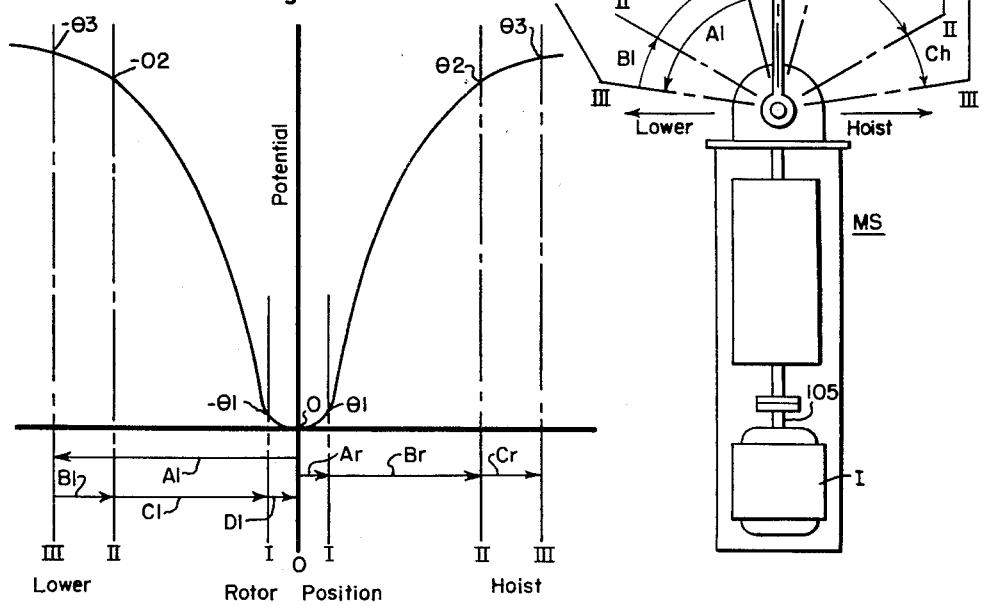
FIG. 2 is a graph of the output potential as a function of the rotor position of the controlling inductor used in the practice of the embodiment of this invention shown in FIG. 1.

The relationship between the current output between the terminals O5 and O6 and the rotor position is presented graphically in FIG. 2, rotor position being plotted horizontally and potential output vertically. It is seen that in the O position of the rotor, the current output from the conductors O5 and O6 is zero, and that the output increases as the angular position is varied from O position either in one direction or the other, the increase being substantial in each case between a rotor angle $\theta1$ or $-\theta1$ and a rotor angle $\theta2$ or $-\theta2$ and being small between O and $\theta1$ or $-\theta1$ and between $\theta2$ or $-\theta2$ and $\theta3$ or $-\theta3$. The handle HA of the master switch MS is so connected to the rotor 103 that the rotor is in O position represented in FIG. 2 when the handle is in neutral position N, the rotor is at angle $\theta 1$ or $-\theta 1$ when the handle is set so that the master switch is in hoist position I or in lower position I, respectively, the rotor is in angle position $\theta 2$ or $-\theta 2$ when the master switch MS is in hoist position II or lower position II, respectively, and the rotor is in angle position $\theta 3$ or $-\theta 3$ when the master switch is in hoist position III or lower position III, respectively. Since the master switch may be set steplessly at intermediate points between hoist or lower positions I and II, the rotor may be set at the same time to have outputs continuously variable between the outputs corresponding to the angles $\theta 1$ and $\theta 2$, or $-\theta 1$ and $-\theta 2$, respectively.

The Control Unit includes in addition to the relay LR a relay KR, a relay SR and time delay relays 2T and 3T. The relay LR has a normally closed contact 111 and a normally open contact 113 in addition to the normally closed and normally open contacts 57 and 59 in circuit with the output winding 51 of the amplifier A. The relay KR has normally open contacts 115 and 117. The relay SR has a make coil MC, a hold coil HC and a normally closed contact 119. The relay SR may be actuated by supplying current to the make coil MC. Once it is actuated, it may be held in actuated condition by the supply of current above a predetermined magnitude to the holding coil HC in spite of the fact that the supply of current to the make coil MC has been interrupted. The relay SR is an instantaneous pickup but slow dropout relay. This relay may then remain actuated for a short time after the supply of current to the make coil MC has been interrupted, so that if current is during this time supplied to the hold coil HC, the relay SR remains actuated by the hold coil. The relays 2T and 3T each have a normally open contact 121 and 123 respectively. Each of the latter relays is of the type which closes its contact a predetermined interval of time after being energized, but opens its contact immediately on being deenergized.

The Control Unit and the transformer AT1 is supplied with power from conductors L1 and L3, and this power is available independently of the position of the contactor MN. In situations in which a lower voltage than that available between conductors L1 and L3 is required, the power supply conductors for the Control Unit may be connected to the conductors L1, L3 through a voltage step-down transformer.

The secondary 2AS1 of transformer AT1 is adapted to be connected through contact 77 and brushes 83 to supply the biasing winding 53 of the amplifier A through a rectifier 131 when the master switch MS is in lower positions I and II. The output terminals O5 and O6 of the inductor I are connected through a resistor 133 and a rectifier 135 to the control windings 55 of the amplifier A. This resistor 133 is adapted to be shunted out in hoist position I and in all lower positions of the master switch MS by contacts 71 and 79 and brushes 89. The primary terminals IN3 and IN4 of the inductor I are adapted to be connected between conductors L1 and L3 through a contact 73 of the switch MS and brushes 91 and 93 in all hoist positions of the switch. The terminals IN3 and IN4 are adapted to be connected between the conductors L1 and L3 through contacts 81 and 83 of switch MS, brushes 95, 92 and 91 and through normally open contacts 115 and 117 of the relay KR in all lower positions of the switch MS and through contact 81, brushes 92 and 91, the normally open contact 113 of relay LR and the normally open contact 115 in lower position III of the switch MS. The coil of the contactor MN is adapted to be connected between conductors L1 and L3 through the contact 73 of the master switch MS and brushes 93 and 92, an up-stop limit switch 141 and an overspeed switch 143 (usually centrifugally operated by the motor M) in all hoist positions of the switch MS. The contactor MN is also adapted to be connected between conductors L1 and L3 through contact 83, brush 95, switches 141 and 143 and the normally open contacts 115 and 117 of relay KR in all lower positions of the switch MS and alternatively through the normally open contact 115 of relay KR and the normally open contact 113 of relay LR in lower position III of the switch MS. The coil of the relay LR is adapted to be connected between conductors L1 and L3 only in lower position III of the master switch by contact 83 and brush 94. The coil of relay KR is adapted to be connected between conductors L1 and L3 in all lower positions of the master switch MS through the normally open contact 113 of relay LR. Once it is actuated the coil of relay KR may be locked in lower positions II and I and between these positions through its normally open contact 117, contact 83 and brush 95. The coil of contactor 1A may be connected between conductors L1 and L3 through contact 75 and brushes 96 and 97 in hoist positions II and II of the master switch MS. The coil of relay 2T may be connected between conductors L1 and L3 in hoist position III through contact 75 and brushes 97 and 98 and in lower position III through contact 85 and brushes 97 and 98. The coil of contactor 2A may be connected between conductors L1 and L3 through contacts 75 and 85 and brushes 97 and 98 and through a normally open contact 2T of the switch MS in hoist and lower positions III. The coil of relay 3T may be similarly connected between conductors L1 and L3. The coil of contactor 3A may be connected between conductors L1 and L3 in hoist and lower positions III through contacts 75 and 85 and brushes 97 and 98 and normally open contact 123 of relay 3T. The coil of relay 3A may also be connected between conductors L1 and L3 in hoist and lower positions III through normally closed contact 119 of relay SR.

STAND-BY—FIGS. 1A–1B

In the stand-by condition of the apparatus, power is supplied to the conductors L1, L2, L3 through the usual disconnects or circuit breakers (not shown), and the apparatus is set for operation. In this condition of the apparatus, the switch MS is in the neutral position N.

Transformer AT1 is energized and potential is available across the secondaries 1AS1 and 2AS1. With the switch MS in a neutral position, secondary 2AS1 is open-circuited. In addition, supply of power to the input terminals IN3 and IN4 of the inductor I is interrupted. The biasing and control windings of the amplifier A do not then carry current, and the amplifier has a high impedance so that the control windings of the reactors RD and RU are supplied with only low current and the reactances of these reactors are high. The supply of current through the coil of the contactor MN is interrupted by the master switch MS, and the contactor is deenergized so that its contacts are open and the motor M is disconnected from the supply. The relay LR is also deenergized and its normally closed contacts 57 and 111 are closed. At one of these contacts, the primary AP2 of a transformer AT2 is connected between conductors L1 and L3, and this transformer is energized. The secondary AS2 of this transformer supplies the make coil MC of the relay SR through a rectifier 151. This relay is then actuated and its normally closed contact 119 is opened. Since relay LR is deenergized, relay KR is also deenergized. In the neutral position N of the master switch, relays 2J and 3J and contactors 1A, 2A and 3A are also deenergized, and the resistance in the rotor circuit of the motor M is at a maximum.

OPERATION—FIGS. 1A–1B

Figure 3:
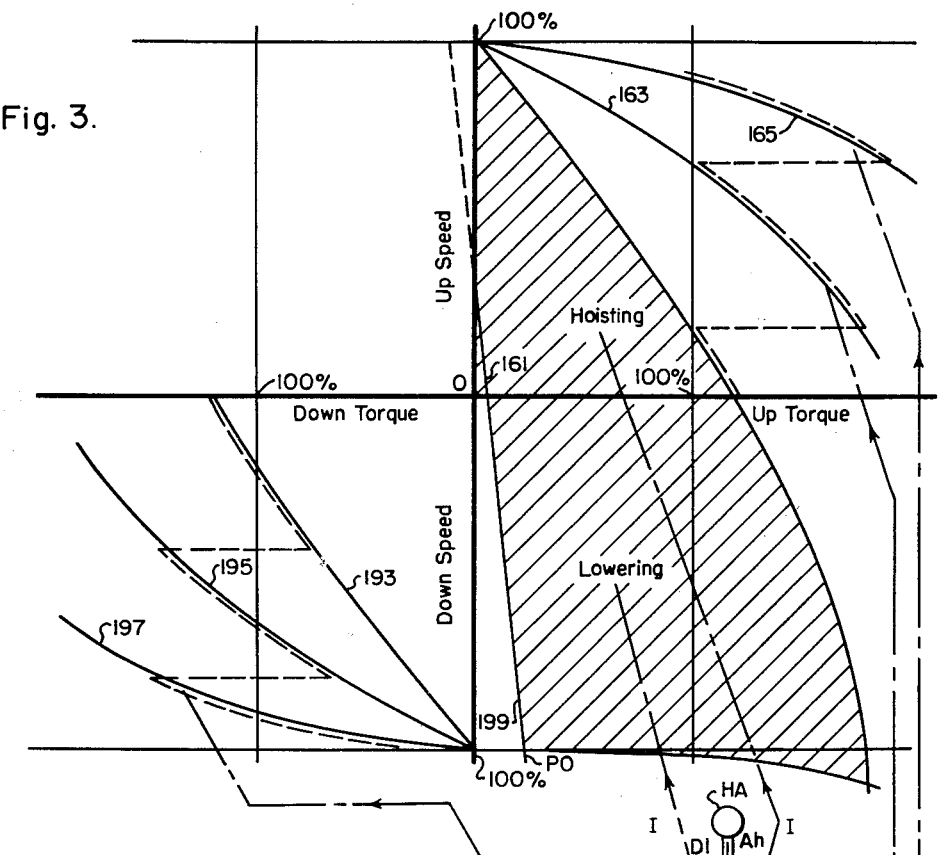
FIG. 3 is a graph and a diagram illustrating the operation of the apparatus shown in FIGS. 1A and 1B.

The operation of the apparatus will be described with reference to FIG. 3. The upper part of FIG. 3 is a speed-torque graph for the motor M presenting a family of speed-torque characteristics. Speed is plotted vertically in percent of synchronous speed and torque horizontally in percent of rated torque. The up torque and down torque and up speed and down speed are plotted to the right and to the left above and below the center of coordinates 0, respectively.

In the upper part of FIG. 3 there are several individual loops representing separate speed-torque characteristics and a shaded area which represents a continuum of speed torque characteristics. The point of intersection of any separate characteristic curve with the torque axis is called the breakaway torque for the characteristic.

In the lower part of FIG. 3, the master switch inductor combination is shown. In this case the master switch MS is shown as having a handle HA which is geared to the drum that carries the contact segments 71 through 85 and to the rotor 103 of the inductor I. The gearing is such that both the drum and the rotor are rotated together. The different hoist and lower positions are labeled in the lower part of FIG. 3 and dash-dot lines extend from these positions to the portions of the upper part of FIG. 3 to which they correspond. The arc over which the handle HA is moved is labeled A$h$, B$h$, C$h$ for the hoist positions, and AL, BL, CL for the lower positions. FIG. 2 is correspondingly labeled. As indicated by the dot-dash lines from the positions of the handle HA, the handle HA may be set steplessly over a continuum of intermediate positions between hoist positions I and II and lower positions II and I so that the Control Unit may be set steplessly to operate over a continuum of control points and the motor M may be set to operate over a continuum of characteristics. Between the neutral position of the switch and hoist position I, between neutral and lower position III, between the continuum and hoist II, between hoist II and hoist III and between the continuum in the lower position and neutral an abrupt change in characteristic takes place.

Assume now that the apparatus is in stand-by as above described and that it is desired to hoist a load. Under such circumstances, the master switch MS is first moved to hoist position I. The output terminals O5 and O6 of the inductor I are then connected directly to the rectifier in series with the control winding of the amplifier A. In addition, the input terminals IN3 and IN4 of the inductor I are supplied with current. The impedance of the amplifier A is then to an extent reduced, and since at this point relay LR is deenergized, the impedance of the up reactor RU is reduced. Further, the contactor MN is energized and its contacts are closed so that the motor M is supplied with power through the inductors RU and RD. In addition, the relay RB which controls the brake B is actuated and the brake B is released. Since the impedance of the inductor RU is at this point reduced, the motor exerts an up torque, but the rotor of the inductor I is at this point at angle $\theta1$ (FIG. 2) so that the current flow through the control windings of the amplifier A and of the reactor RU is small and the up torque exerted is relatively small corresponding to the left-hand boundary 161 of the shaded area of FIG. 3$a$ in the upper right-hand quadrant. The raising or hoisting of the load may be started by the small breakaway torque which is exerted. Because this torque is small, the motor M does not have a tendency to break or damage the cable on the load or to jerk the load.

The handle HA is now moved gradually from hoist position I to hoist position II. This rotates the rotor of inductor I so that its position changes from $\theta1$ to $\theta2$. The output of the inductor I is in this phase of the control sensitive to changes in the rotor or handle positions, the output increasing sharply as the angle increases from $\theta1$ to $\theta2$. There is a corresponding sharper changing decrease in the impedance of amplifier A and increase in the current flow through the control winding 61 of reactor RU so that the impedance of reactor RU is further reduced. The up torque is thus gradually increased.

Eventually the handle HA reaches position II. At this point, resistance is introduced in series with the output terminals O5 and O6 of the inductor I, but this has no effect on the operation of the motor M because contactor 1A is actuated shunting out reactor RU (that is, reducing its impedance to a minimum) at its upper contact 41 and also shunting out the resistors 11 in the rotor circuit of motor M. The speed-torque characteristic at which the motor M now operates is represented by the first curve 163 to the right of the shaded area in the upper right-hand corner. The motor M accelerates as represented by the broken line along the curve.

If it is desired to further increase the speed of the load, the handle HA is now moved to hoist position III. In the latter position, relay 2T is actuated, and after a predetermined time interval, contactor 2A is actuated through the normally open contact 121 of 2T. Relay 3T is also energized through the normally open contact of 2T, and after a predetermined time interval, closes its normally open contact 123 so that contactor 3A is actuated. This reduces the resistance in series with the rotor of motor M to a minimum, and the speed torque characteristic of the motor corresponds to the highest breakaway torque, bringing the motor M up to synchronous speed as represented by the broken line along curve 165.

When the load approaches landing, the master switch MS may be reverted to the neutral position so that the load reaches the landing at the proper speed. The resistor 133 is connected in circuit with the output terminals O5 and O6 in hoist positions II and III in which the reactor RU is shunted out. This maintains the control winding 55 and reactor RU partially excited so that when the master switch MS is returned to hoist position I a sharp transient will not occur.

During hoisting, relay LR is unactuated so that its normally closed contact 111 in series with primary AP2 remains closed, and the make coil MC of relay SR remains actuated. Relay SR then does not affect the hoisting operation.

Now assume that it is desirable to carry out a lowering operation. To start this operation, it is necessary that the handle HA be moved first to lower position III, as indicated by the arrow AL, because in lower positions I and II the contactor MN remains unactuated. With the handle HA in lower position III, relay LR is actuated closing its normally open contact 59 in series with the control winding 31 of reactor RD and opening its normally closed contact 57 in series with the control winding 33 of reactor RU. Normally closed contact 111 of relay LR now opens and the current to make coil MC of relay SR is interrupted. But for a short time interval relay SR remains actuated even if at this time coil HC is currentless. Also normally open contact 113 of relay LR closes, and relay KR is actuated closing its contacts 115 and 117 and locking itself in. Contactor MN is then energized through the normally open contacts 115 and 117 of relay KR or alternatively through a normally open contact 115 of relay KR and normally open contact 113 of relay LR. The actuation of contactor MN connects the motor M to the conductors L1 through L4 through the reactors RD and RU and releases brake B. The motor then exerts a torque on the load. If this torque is substantial, there is substantial current through the resistance 11 in series with the rotor of the motor M, and the holding coil of the relay SR remains actuated through the rectifier 191 so that its normally closed contact 119 is open. The actuation of contactor 3A, the coil of which may now be connected between conductors L1 and L3 through the contact of SR and the contact 85 of the master switch, is then prevented.

In lower position III, the input terminals IN3 and IN4 of inductor I are also connected to conductors L1 and L3 through contacts 81 and 83 of the master switch MS and the normally open contacts 115 and 117 of the relay KR. This connection remains locked in as the master switch MS is now returned to lower positions II and I. Further, through another contact 79 of the master switch, the resistor 133 in series with the output terminals O5 and O6 of the inductor I is shunted out.

With the apparatus as now set, the rotor of the inductor I is at $-\theta3$ of FIG. 2. The control winding of the amplifier A is then supplied with substantial current, but the biasing winding of amplifier A is disconnected. The amplifier A then has low impedance, and substantial current is supplied to the control winding 31 of the down reactor RD. The motor M then has a substantial down torque corresponding to the first curve 193 on the right in the lower left-hand quadrant. As the motor speed under the action of the supply and of the load increases, corresponding to the broken line curve along curve 193, the current flow through the resistance 11 in the rotor circuit decreases and the supply of current of the holding current of the relay SR is decreased so that the relay drops out. At this point, contactor 3A is actuated shunting out all resistances 11, 13, 15 in the circuit of the rotor of motor M. Alternatively, if the load on the motor happens to be substantial so that the relay SR remains actuated, relay 2T which is energized through the contact 85 of the master switch MS in lower position III times out actuating contactor 2A and energizing relay 3T which, in turn, causes contactor 3A to be actuated after a time delay. In this case, the motor passes through the three speed-torque characteristics 195, 197, 199 in the lower left-hand quadrant of the upper part of FIG. 3.

Whatever the initial mode of operation, the motor soon reaches a substantial speed and the load may have a tendency to overhaul. Under such circumstances, the handle HA is moved to lower position II. At this point, the output of the rotor position corresponds to $-\theta 2$ of FIG. 2. In addition, the biasing winding 53 is now supplied from the secondary 2AS1. The biasing current counteracts the current through the control winding 55 supplied by the inductor I, and the impedance of amplifier A is raised substantially. In addition, relay LR is de-energized disconnecting amplifier A from the control winding of reactor RD and connecting it to the control winding of reactor RU. The impedance of reactor RD is then raised, and the control winding of reactor RU is connected to amplifier A. But since the impedance of amplifier A is high, the control winding of reactor RU draws only a small current, and the impedance of reactor RU is smaller than the impedance of reactor RD by a relatively small magnitude. Relay SR is now again actuated because the normally closed contact 111 in series with primary AP2 is closed, but this has no effect since the circuits through the coil of contactor 3A (and in addition through the coils of contactors 1A and 2A, and relays 2T and 3T) are opened. There is now a relatively small up torque exerted by the motor M. Since the speed of the motor downward may now be synchronous speed or greater because of the overhauling, the operation of the motor now corresponds to the point PO where the first line 199 on the left in the lower right-hand quadrant intersects the line of down synchronous speed.

The speed of the motor may now be further reduced by gradually moving the handle HA from lower position II to lower position I, as indicated by the arrow CL in FIGS. 2 and 3. This causes the rotor of the inductor I to move from position $-\theta 2$ to position $-\theta 1$. The biasing current (through winding 53) is now counteracted to a smaller and smaller extent, and the impedance of amplifier A and of reactor RU gradually decreases so that the speed torque characteristic of the motor is changed steplessly, as represented by the shaded area in the lower right-hand quadrant of FIG. 3. The up torque is thus gradually increased until switch position I is reached. At this position, the up torque is substantial and the load speed may be reduced to a landing speed. When the load reaches its terminal position, the master switch MS may be reverted to the neutral position.

CONCLUSION

The apparatus shown in FIGS. 1A, 1B, 2 and 3 is of simple and relatively low-cost structure, and may be operated in a highly precise manner to hoist and lower a load. One of the important features of this apparatus is the master switch inductor assembly by means of which the control circuit of the motor may be operated over a continuum of control points so that the motor operates over a continuum of speed torque characteristics as represented by the shadded curve shown in FIG. 3.

As compared to the prior art hoists the important changes involved in the apparatus shown in FIGS. 1A and 1B are: (a) elimination of load detector; (b) elimination of the pilot generator; (c) elimination of separate vernier (inductor) and incorporation of similar device in master switch, both operating from the same handle; and (d) a simplified control.

In the system shown in FIGS. 1A and 1B the crane or hoist operator must take over the functions performed by the pilot machine and load detector in the prior art apparatus. Means are provided to get any desired lowering speed for any overhauling load, but it is under the control of the operator. Protection against dangerously high lowering speeds is provided by relay SR.

In a typical situation where a load is raised at the end of movement A$h$, power is applied at some selected low torque such as 25%. Through angle B$h$, the torque increases stepless to 110% near the end of the movement. Completing the movement B$h$ closes one accelerating contactor 1A and brings the full load speed up to about 60%. Completing movements C$h$ closes the remaining two accelerating contactors 2A and 3A to bring the motor M up to full rated speed.

In a typical lowering operation nothing happens while the switch is moved through the angle A$l$. When position III is reached, power comes on and the brake B is reelased. If the switch is permitted to remain in position III, down torque builds up, the speed increased to nearly synchronous or slightly over if there is overhauling load. If the switch is immediately returned through movement B$l$ very light up torque builds up in position II. Through movement C$l$ the torque builds up stepless to 110% at position I. The up torque may be varied at will between the limits mentioned by manipulation of the handle in the C$l$ range. Movement through D$l$ to N cuts off power and sets the brake B.

In normal operation, the motor is not energized or the brake B released when moving from off to the point III lowering. A master switch handle contact or foot button may be used to pick up relay KR to apply countertorque directly at any point in lowering angle B$l$ without the necessity of first going to the point III to start.

The manner in which the operator controls the hoist may be briefly summarized with reference to FIGS. 2 and 3. Movement of the master switch MS to point I hoisting closes contactor MN through MS and energizes the inductor contact of MS. At 15 degrees the voltage of the inductor is low and consequently up torque reactor RU calls for low up torque. Advancing through the B$h$ angle brings the voltage of the inductor up to maximum or nearly maximum near the end of the angles just before point II is reached. At this time the torque will be about 110% normal. At point II contactor 1A closes, followed by 2A automatically through accelerating relay 2T. This shorts the up torque reactor RU and weakens its excitation and also removes two steps of secondary or rotor resistance to bring the speed to about 60% at full load. Movement to the point III closes contactor 3A under control of the accelerating relay, for automatic acceleration full speed.

Movement of the master switch MS to the point I lowering biases the pilot amplifier A to immediately excite the up torque reactor RU to maximum. No contactors or relays are closed, power is not applied and the brakes do not release. As point II is approached and reached, the voltage to the amplifier A control winding 55 cancels the effect of the bias winding 53 and kills the up torque excitation. On the point III relay LR picks up, followed by KR and contactor MN. Master switch MS contacts open to cut off the bias 53. Relay LR contacts transfer the output of the amplifier A to the down torque reactor RD which is immediately fully excited due to removal of bias from the amplifier A. Contactors 2A and 3A close in sequence. This applies 3-phase essentially balanced voltage to the motor M primary; all resistance is remover from the motor M secondary rotor. With no load on the hook H the motor M runs at synchronous speed; with overhauling load it regenerates. Relay SR operates to close 3A in advance of the accelerating relays, if the acceleration is very rapid due to overhauling load. Returning to point II drops out contactors 2A and 3A and relay LR but MN remains closed through a holding contact. All secondary rotor resistance is inserted, the amplifier A output is transferred back to the up torque reactor RU, due to reestablishing the bias of the amplifier A. Backing up the handle HA towards point II brings up the up torque excitation to maximum as point II is reached.

DESCRIPTION—FIG. 4

Figure 4:
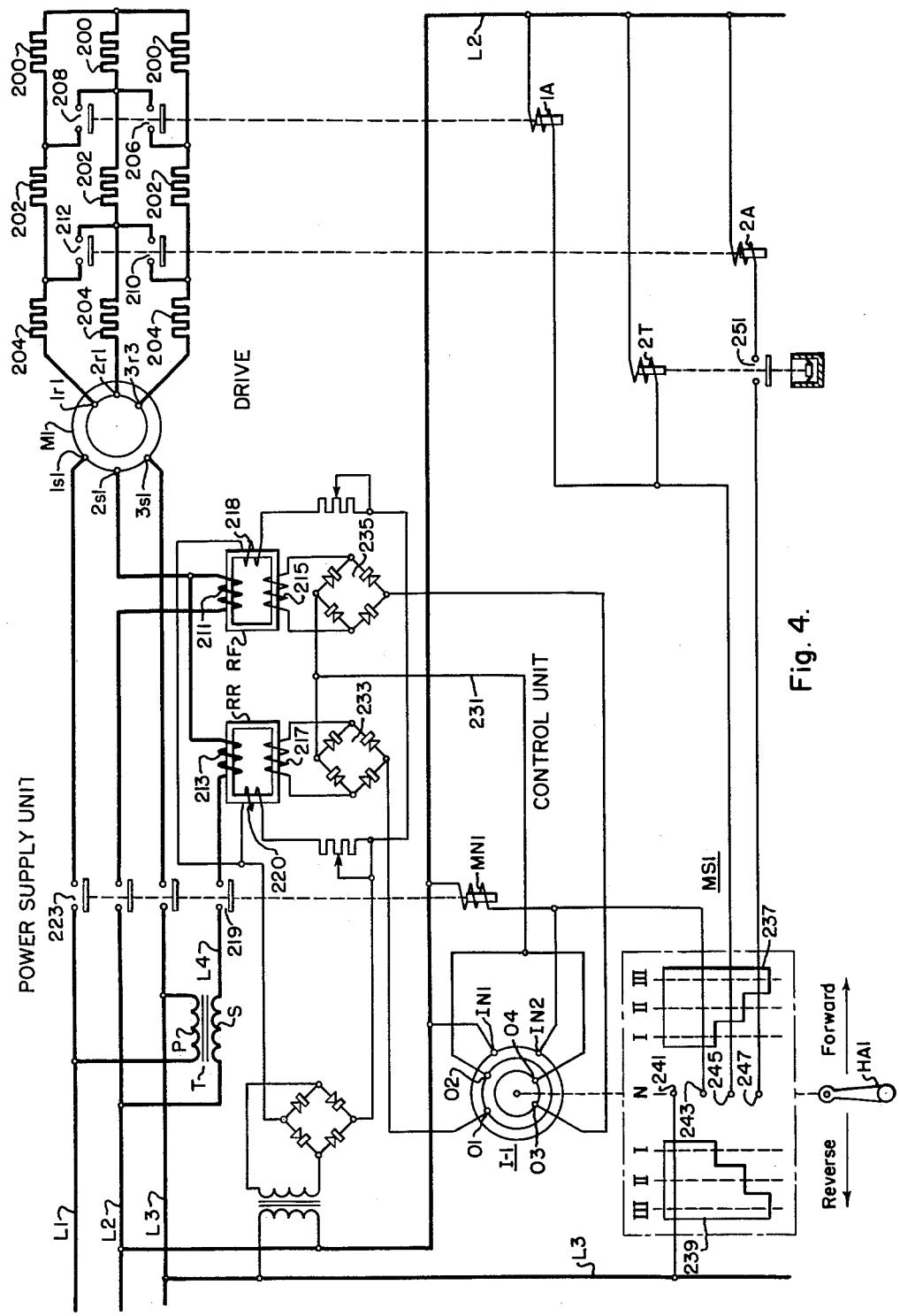
FIG. 4 is a circuit diagram of a drive for a bridge of a hoist or crane in accordance with this invention.

The apparatus shown in FIG. 4 is particularly suitable for controlling a load in a situation in which the force of gravity is not involved to any important extent. Such a situation arises in the control of a bridge which moves a crane lengthwise of an aisle of a manufacturing plant; it may also arise in the case of the trolley which moves the crane along the bridge. In this case, the operation of the drive in the two directions in which the load is moved is symmetric. The apparatus shown in FIG. 4 includes a Drive, a Power Supply Unit and a Control Unit. The Drive includes a motor M1 having supply terminals 1S1, 2S1, 3S1 and rotor terminals $1r1$, $2r1$, $3r1$. A plurality of resistors 200, 202, 204 are connected to the rotor terminals $1r1$, $2r1$, $3r1$, and these resistors are adapted to be shunted out by the contacts 206, 208, 210, 212 of contactors 1A and 2A.

The Power Supply Unit includes a pair of reactors RF, a forward reactor and RR, a reverse reactor. Each reactor has an output winding 211 and 213 and a control winding 215 and 217. The reactors RR and RF may also include biasing windings 218 and 220 through which current to counteract the effect of the current through the control windings 215 and 217 may be supplied. The Power Supply Unit is supplied similarly to the Unit of FIGS. 1A and 1B from a duplex interconnected three-phase system including conductors L1, L2, L3 and L4. The conductors L1, L2 and L3 are adapted to be connected to a commercial three-phase supply of the usual 220 or 440 type. Conductor L4 is supplied from the secondary S of a phase reversing transformer T, the primary P of which is connected between conductors L1 and L3. Where the bridge shown in FIG. 4 is part of the apparatus including the hoist shown in FIGS. 1A and 1B, the conductors L1, L2, L3, L4 serve for both systems.

One terminal of the output windings 211 and 213 of each of the reactors RR and RF are common and are connected to the terminal $2s1$ of the motor M. The other terminal of the output winding 213 of reactor RR is adapted to be connected to conductor L4 through a contact 219 of contactor MN1. The other terminal of the output winding 211 of reactor RF is similarly adapted to be connected to conductor L2 through another contact 221 of contactor MN1. Terminals $1s1$ and $3s1$ of the motor M are respectively adapted to be connected to conductors L1 and L3 through other contacts 223 and 225 of contactor MN1.

The Control Unit is supplied from conductors L2 and L3 and includes inductor I–1, the master switch MS1, and the time delay relay 2T. Where the bridge of FIG. 4 and the hoist of FIGS. 1A and 1B are part of the same apparatus, the supply of the Control Unit of the hoist from L1 and L3 and the supply of the Unit of the bridge from L2, L3 is particularly desirable. The inductor I–1 is similar to inductor 1VI of application Serial No. 521,104. This inductor is described on page 33 of application Serial No. 521,104, beginning in line 8, and briefly is a repulsion-start induction-run motor with the commutator and brush rigging omitted. The rotor winding includes two separate insulated sections spaced electrically by 90°. The two rotor sections of the inductor thus have potential outputs of which vary in opposite senses for any position of the rotor.

The inductor I–1 has input terminals IN1 and IN2, and output terminals O1 and O2 and O3 and O4. Output terminals O2 and O4 are connected to a common conductor 231, and the potential between output terminals O1 and the common conductor, and output terminal O3 and the common conductor, vary in opposite senses for any position of the rotor.

A graph presenting the outputs of the inductor I–1 as a function of the rotor position ($\theta$) is presented in FIG. 5. In this case, output potential is plotted vertically and rotor position ($\theta$) horizontally. The loop labeled $-\theta4$, $\theta7$, $\theta5$, $\theta6$ corresponds to the potential between terminal O1 and the common conductor 231. The loop labeled $\theta4$, $\theta7$, $-\theta5$, $-\theta6$ corresponds to the potential between O1 and the common conductor 131. The effect of the potential corresponding to the intersection 250 of curves $-\theta4$, $\theta7$, $\theta5$, $\theta6$ and $\theta4$, $-\theta7$, $-\theta5$, $-\theta6$ may be adjusted by varying the current through bias windings (not shown) on the reactors RR and RF.

The terminals O1 and the common conductor 131 are connected through a rectifier 233 to the control winding 217 of the reactor RR; the terminals O3 and the common conductor 231 are connected to the control winding 215 of the reactor RF through a rectifier 235.

The switch MS1 is of the usual drum type having an actuating handle HA1 and having a drum with contact segments 237 and 239 at forward and reverse positions I, II and III and brushes 241, 243, 245, 247. The segments 237 and 239 are symmetric. The handle HA1 is connected mechanically to the rotor of the inductor I–1 so that movement of the handle rotates the rotor. With the switch in the neutral position, the rotor of the inductor is in a cenral position at which the outputs between terminals O1 and the common conductor, and O3 and the common conductor, are substantially equal (point 250, FIG. 5). In addition, the input terminals IN1 and IN2 are disconnected from the conductors L2 and L3. With the switch MS1 in forward or reverse positions I, II and III, input potential is supplied to the inductor I–1, and in addition, the contactor MN1 is connected between conductors L2 and L3. With the switch MS1 in forward or reverse positions II and III, the coil of relay 2T is connected between conductors L2 and L3, as is also contactor 1A. With the switch MS1 in forward or reverse positions III, the coil of the contactor 2A is adapted to be connected between conductors L2 and L3 through the normally open contact 251 of relay 2T.

STAND-BY—FIG. 4

In the stand-by condition of the FIG. 4 apparatus, conductors L1, L2, L3 and L4 are energized, but the coil of contactor MN1 is disconnected from the supply conductors L2 and L3, and the input terminals IN1 and IN2 are disconnected from the supply conductors L2 and L3 so that inductor I–1 is deenergized. The motor M and the reactors RR and RF are also disconnected from the supply and relay 2T and contactors 1A and 2A are deenergized.

OPERATION—FIG. 4

The operation will be explained with reference to FIG. 6. The upper part of FIG. 5 is similar to FIG. 3a except that the curves corresponding to forward and reverse are symmetric since the force of gravity is not involved. The upper part of FIG. 6 is similar to the upper part of FIG. 3 representing the master-switch-inductor combination including the master switch MS1 and the inductor I–1.

Assume now that it is desirable to move the load in a forward direction. Under such circumstances, the handle HA1 is moved over arc $Ff$ to forward position I.

Inductor I–1 is then excited and contactor MN1 is actuated so that the motor M and the reactors RR and RF are connected to the supply. The output of the inductor I–1 between terminal O3 and the common conductor 231 then corresponds to the ordinate at the point θ7, the output between terminal O1 and the common conductor corresponds to the ordinate at point θ8 on FIG. 5. It is seen that the potential across the control winding 215 of reactor RF is increased with reference to that at the O position of the rotor, and the potential across the control winding 217 of reactor RR is correspondingly decreased. The impedance of reactor RF is thus decreased, and the impedance of reactor RR increased so that there is a forward torque. The setting of the apparatus now corresponds to the boundary 253 of the shaded area to the right of the speed axis.

The handle HA1 may now be moved steplessly and gradually between forward positions I and II. This gradually increases the potential output between terminal O3 and the common conductor 231 and decreases the output between O1 and the common conductor. The speed-torque characteristic of the motor M is thus changed steplessly in the direction of greater breakaway forward torque, and the load is moved at an accelerated rate. When the master switch MS1 reaches forward position II, contactor 1A is actuated, shorting a portion of the resistance 200 out in the rotor circuit of motor M1. The speed-torque characteristic of the motor then becomes that corresponding to the first curve 261 to the right of the shaded area in the upper right-hand quadrant of FIG. 6, and the motor accelerates. In addition, relay 2T is energized and starts to time out. When relay 2T has timed out, its normally open contact 251 is closed, and when the switch MS1 is moved to forward position III, contactor 2A is actuated, shorting additional resistance 202 out of the rotor circuit of motor M. The motor then accelerate to synchronous speed, and the load reaches its terminal position.

Actuation of handle HA1 in a reverse direction produces similar operation of the apparatus, but in this case, the potential between terminal O1 and the common conductor 231 increases, the potential between terminal O3 and the common conductor decreases so that the impedance of reactor RR decreases, and the impedance of reactor RF increases and the motor M1 is accelerated in the reverse direction.

FIG. 7

Figure 7:
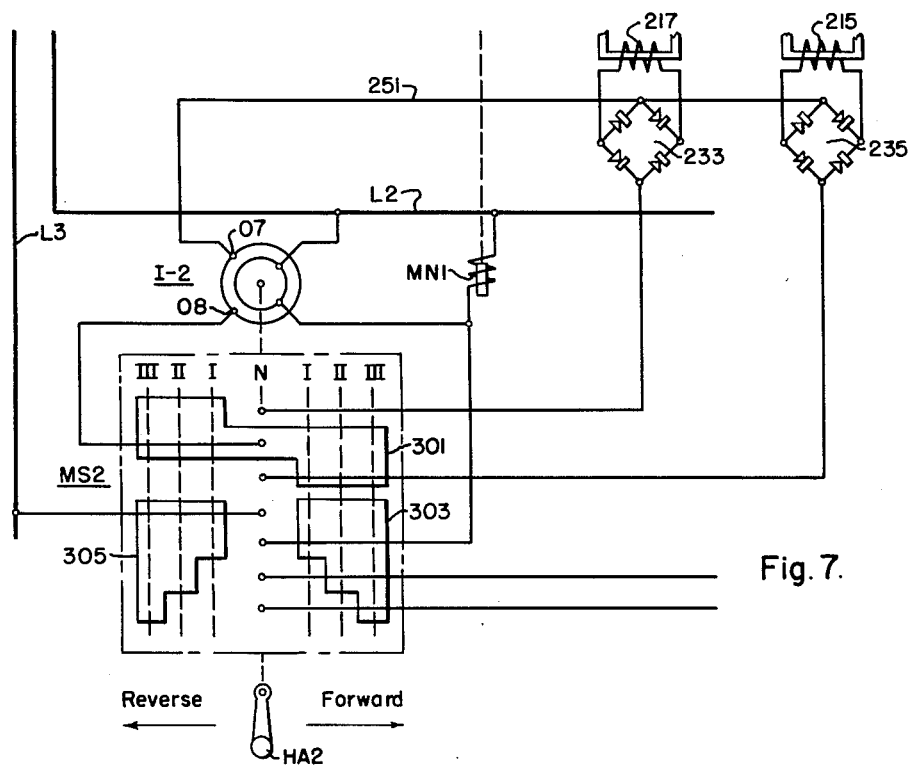
FIG. 7 is a portion of a circuit diagram illustrating a modification of the apparatus shown in FIG. 4.

FIG. 7 is a modification of the apparatus shown in FIG. 4 in which the inductor I–2 is of the type shown in FIGS. 1A–1B having only two output terminals O7 and O8. In this case the master switch MS2 has a segment 301 in addition to a pair of segments 303 and 305 similar to the segments 237 and 239 of MS–1 (FIG. 4). This segment 301 connects I–2 to supply rectifier 233 and control winding 217 when MS2 is in the reverse positions and to rectifier 235 and winding 215 when MS2 is in the forward position.

Figure 8:
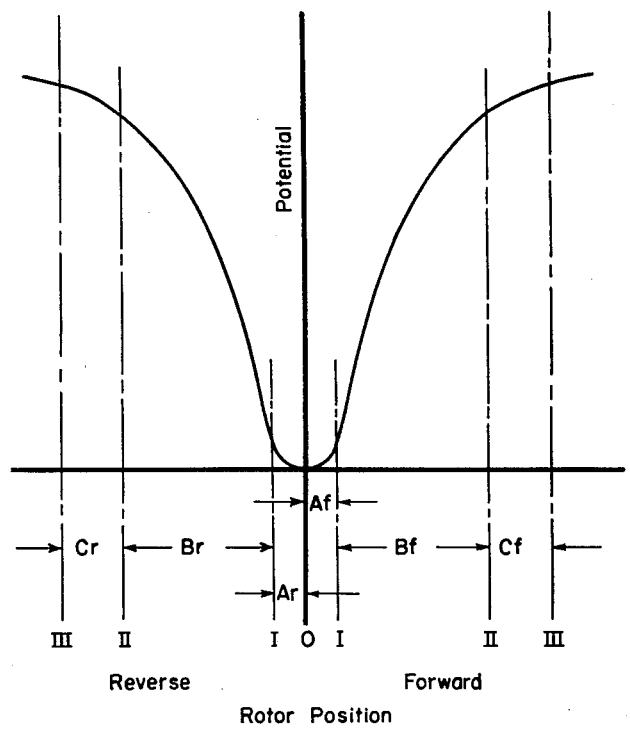
FIG. 8 is a graph for the controlling inductor used in the practice of the embodiment of the invention shown in FIG. 7.

The effect of moving the handle HA2 on the potential supplied to the windings 217 and 215 is shown in FIG. 8. Here potential is plotted vertically and angular position of the handle horizontally. It is seen on the movement of the handle in either direction from the center control current flows through the winding 217 or 215 and this control current increases as the angle of the handle HA2 from the center increases. This would reduce the impedance of reactor RR or RF depending on the direction of movement of the handle HA2.

CONCLUSION

The apparatus disclosed herein is of simple and low-cost structure compared to other apparatus of the same type. One of the important features of this invention is the novel master-switch-inductor combination. This feature may be applied to a complete system including crane, bridge and trolley. The crane hoist has been described.

In general, bridge and trolley controls include one contactor and reversing reactors in the motor primary. The rotor circuit includes either a permanent fixed resistor or a resistor with secondary contactors if desirable.

Movement of the master switch MS1 in either direction closes the primary contactor and partially excites both reactors. Advancing the movement forward kills off the reverse reactor RR and brings up the forward FF to maximum excitation. Advancing reverse reactor RR kills off the forward reactor RF and brings up the reverse.

The following table shows the relationship between three types of prior art apparatus and a crane combination of the type including a hoist control as shown in FIGS. 1A, 1B and bridge and trolley controls as shown in FIG. 4 as to the total number of contacts and total number of trolley rails.

*Comparison of Electrical Contacts and Trolley Rails*

|  | Prior Art Apparatus 1 | Prior Art Apparatus 2 | Prior Art Apparatus 3 | Apparatus as shown in Figs. 1A, 1B and 4 |
|---|---|---|---|---|
| Hoist Main Circuit | 18 | 14 | 10 | 12 |
| Control | 26 | 17 | 19 | 15 |
| Master Lw | 14 | 11 | 12 | 10 |
| Main Trolley Rails | 6 | 6 | 6 | 6 |
| Control Trolley Rails | 5 | 5 | 5 | 5 |
| Trolley Main Circuit | 12 | 12 | 4 | 4 |
| Control | 15 | 15 | 1 | 1 |
| Main Trolley Rails | 6 | 6 | 3 | 3 |
| Control Trolley Rails | 0 | 0 | 0 | 0 |
| Bridge Main Circuit | 16 | 16 | 4 | 4 |
| Bridge Control Circuit | 16 | 16 | 2 | 2 |
| Bridge Master Lw | 7 | 8 | 5 | 5 |
| Total Contacts | 131 | 116 | 58 | 48 |
| Total Trolley Rails | 17 | 17 | 14 | 11 |

While specific embodiments of this invention have been disclosed herein, many modifications are feasible. This invention then is not to be restricted except insofar as necessitated by the prior art.

I claim as my invention:

1. Apparatus for controlling the direction of rotation, speed and torque of a motor comprising control means connected to said motor for controlling said motor in accordance with the setting of said control means, means connected to said control means for setting said control means at discrete control points to cause said motor to operate along predetermined speed-torque characteristics, and means connected to and actuable by said setting means for setting said control means over a continuum of control points between at least a first and a second of said discrete points to vary the speed-torque characteristics of the operation of said motor continuously between the characteristic corresponding to said first point and the characteristic corresponding to said second point.

2. In combination an inductor having a stator and a rotor, said rotor having a first winding and a second winding, each said windings having terminals and said windings insulated from each other and displaced so that when an alternating potential is impressed on said stator the potential output between said first winding varies in opposite sense to the potential of said second winding on displacement of said rotor, one terminal of each of said first and second windings being electrically common, a first reactor having an input winding, a second reactor having an input winding, each last-named windings having terminals, one terminal of each of said input windings being electrically common, means connecting said common terminals of said rotor windings to said common terminal of said input windings, means connecting another terminal of said first rotor winding to another terminal of said input winding of said first reactor, and means connecting another terminal of said second rotor winding to another terminal of said input winding of said second reactor.

3. In combination a polyphase motor, a plurality of polyphase supply conductors, a first reactor having an input winding and an output winding, a second reactor having an input winding and an output winding, said input windings having terminals, means connecting said motor, said supply conductors and said output windings, so that the torque of said motor depends on the relative magnitudes of the impedances of said output windings, a decrease in the impedance of said output winding of said first reactor and an increase in the impedance of said output winding of said second reactor tending to produce torque in one direction and an increase in the impedance of said output winding of said first reactor and a decrease in the impedance of said output winding of said second reactor tending to produce torque in the opposite direction, an inductor having a stator, a first rotor winding and a second rotor winding, said rotor windings having a common electrical terminal and each of said rotor windings having another terminal, said rotor windings being so related to said stator, that for displacement of said rotor in any direction the potential output between said other terminal and said common terminal of said first rotor winding varies in one sense and the potential output between said other terminal and said common terminal of said second rotor winding varies in the opposite sense, means connecting said common terminal to one terminal of each of said input windings, means connecting the other terminal of said input winding of said first reactor to said other terminal of said first rotor winding, and means connecting the other terminal of said input winding of said second reactor to said other terminal of said second rotor winding.

4. Apparatus for controlling the supply of power from a source to a motor connected to a load to move said load in one direction or the opposite direction comprising in combination, control means connected to said source and said motor for controlling the direction of rotation and speed and torque of said motor in accordance with the setting of said control means, and setting means for said control means including a movable component, said setting means having an output and the position of said component determining said output, means connecting said setting means to said control means so that said output of said setting means sets said control means to control said motor, said setting means also including a master switch having a manually actuable handle and means connecting said switch electrically in control-selecting relationship with said control means so that said switch may be set to cause said control means to control said motor within different ranges of speed and torque for each said direction of rotation, and mechanical connections between said handle and said movable component so that the position of said handle determines the position of said movable component within at least certain of said ranges.

5. Hoist apparatus comprising in combination a hoist motor, power supply conductors, control means connected to said motor for controlling the direction of rotation, speed and torque of said motor, means to be actuated for connecting said conductors in energizing and control relationship with said control means and said motor, master switch means having a neutral position and at least a first, a second and third hoist position and at least a first, a second and a third lower position, said actuable means being normally unactuated and said motor and control means being disconnected from said conductors in said neutral position and said first and second lower positions, means responsive to said switch means when set in said first hoist position connected to said actuable means for actuating said actuable means, additional means responsive to said switch means in said first hoist position connected to said control means to set said control means on a control point such as to cause said motor to operate in a hoisting direction along an initial speed-torque characteristic at which said motor has a relatively low breakaway hoisting torque, means responsive to gradual movement of said switch means from said first hoist position to said second hoist position and connected to said control means to set said control means over a continuum of control points between said first hoist position and said second hoist position to cause said motor to operate along continuously varying speed-torque characteristics corresponding to continuously greater breakaway hoisting torques, means responsive to said switch means when set in said third hoist position and connected to said control means for setting said control means on a control point to cause said motor to operate along a speed-torque characteristic corresponding to a substantially greater breakaway hoisting torque than that caused with the switch means in said second hoist position, means responsive to said switch means when set in said third lower position and connected to said actuable means for actuating said actuable means, additional means responsive to said switch means in said third lower position and connected to said control means for setting said control means on a control point to cause said motor to operate along a speed-torque characteristic corresponding to a substantially lowering breakaway torque, additional means responsive to said switch means when set in said third lower position and connected to said actuable means for conditioning said control means to operate in said first and second lower positions, means connected to said control means and responsive to said switch means when set in said second lower position after being so conditioned for setting said control means on a control point to cause said motor to operate along a speed-torque characteristic corresponding to a small breakaway hoisting torque, and means connected to said control means and responsive to the gradual movement of said switch means from said second lower position to said first lower position after being conditioned as aforesaid to set said control means over a continuum of control points between said second lower position and said first lower position to cause said motor to operate along continuously varying speed-torque characteristics corresponding to continuously greater hoisting breakaway torques.

6. Hoist apparatus comprising in combination a hoist motor, power supply conductors, control means connected to said motor for controlling the direction of rotation, speed and torque of said motor, means to be actuated for connecting said conductors in energizing and control relationship with said control means and said motor, master switch means having a neutral position and a plurality of hoist positions including a first hoist position and a second hoist position between which said switch means is capable of gradual substantially stepless movement and a plurality of lower positions including a first lower position and a second lower position between which said switch means is capable of gradual substantially stepless movement and a conditioning lower position, said actuable means being normally unactuated and said motor and control means being disconnected from said conductors in said neutral position and said first and second lower positions, means responsive to said switch means when set in said first hoist position connected to said actuable means for actuating said actuable means to set said control means on a control point such as to cause said motor to operate, means responsive to gradual movement of said switch means from said first hoist position to said second hoist position and connected to said control means to set said control means over a continuum of control points between said first hoist position and said second hoist position to cause said motor to operate along continuously varying speed-torque characteristics corresponding to continuously greater breakaway hoisting torques, means responsive to said switch means when set in said conditioning lower position and connected to said actuable means, additional means responsive to said switch means when set in said conditioning lower position and connected to said actuable means for conditioning said control means to operate in said first and second lower positions, and means connected to said control means and responsive to the gradual movement of said switch means from said second lower position to said first lower position after being conditioned as aforesaid to set said control means over a continuum of control points between said second lower position and said first lower position to cause said motor to operate along continuously varying speed-torque characteristics corresponding to continuously greater hoisting breakaway torques.

7. Apparatus for moving a load in a forward direction or in a reverse direction comprising in combination, a motor, power supply conductors, control means connected to said motor for controlling the direction of rotation, speed and torque of said motor, means to be actuated for connecting said conductors in energizing and control relationship with said control means and said motor, master switch means having a neutral position, a plurality of forward positions and a plurality of reverse positions, said last-named positions including at least a first forward position and a second forward position between which said switch means is capable of gradual substantially stepless movement and a first reverse position and a second reverse position between which said switch means is capable of gradual substantially stepless movement, said actuable means being unactuated and said motor and control means being disconnected from said conductors in said neutral position, means responsive to said switch means in at least one of said forward positions connected to said actuable means for actuating said actuable means, means responsive to gradual movement of said switch means between said first and said second forward positions and connected to said control means to set said control means over a continuum of control points between said first and said second forward positions to cause said motor to operate along continuously varying speed-torque characteristics from a characteristic having a lower breakaway forward torque in said first forward position to a characteristic having a higher breakaway forward torque in said second forward positions, means responsive to said switch means in at least one of said reverse positions connected to said actuable means for actuating said actuable means, and means responsive to gradual movement of said switch means between said first and said second reverse positions and connected to said control means to set said control means over a continuum of control points between said first and second reverse positions to cause said motor to operate along continuously varying speed-torque characteristics from a characteristic having a lower breakaway reverse torque in said first reverse position to a characteristic having a higher breakaway reverse torque in said second reverse position.

8. Apparatus for moving a load comprising in combination, a motor, power supply conductors, control means connected to said motor for controlling the speed and torque of said motor, means to be actuated for connecting said conductors in energizing and control relationship with said control means and said motor, master switch means having a neutral position and a plurality of positions including a first and a second operating position between which said switch means is capable of gradual substantially stepless movement, said actuable means being unactuated and said motor and control means being disconnected from said conductors in said neutral position, means responsive to said switch means in at least one of said operating positions connected to said actuable means for actuating said actuable means, and means responsive to gradual movement of said switch means between said first and said second operating positions and connected to said control means to set said control means over a continuum of control points between said first and said second operating positions to cause said motor to operate along continuously varying speed-torque characteristics from a characteristic having a lower breakaway operating torque in said first operating position to a characteristic having a higher breakaway operating torque in said second operating positions.

9. Apparatus for controlling the operation of a load comprising a first reactor having reactance controlling winding means, means connected to said reactor for connecting said reactor to said load to produce operation of said load in a first sense depending on the reactance of said reactor, a second reactor having a reactance controlling winding means, means connected to said second reactor fore connecting said second reactor to said load to produce operation of said load in a second sense depending on the reactance of said second reactor, a magnetic amplifier common to both said reactors and having output winding means and control winding means, means connected to said output winding means of said amplifier and said control winding means of said reactors for selectively connecting said output winding means of said amplifier to said control winding means of said reactors, and means for supplying control current to said control winding means of said amplifier.

10. Apparatus for controlling the operation of a motor comprising a first reactor having reactance controlling winding means, means connected to said reactor for connecting said reactor to said motor to control the speed and torque of said motor in a first sense in dependence upon the reactance of said reactor, a second reactor having reactance controlling winding means, means connected to said second reactor for connecting said second reactor to said motor to control the speed and torque of said motor in a second sense in dependence upon the reactance of said second reactor, a magnetic amplifier common to both said reactors and having output winding means and control winding means, means connected to said output winding means of said amplifier and said control winding means of said reactors for selectively connecting said output winding means to said control winding means of said reactors, and means connected to the control winding means of said amplifier for supplying controlling ampere turns thereto.

11. Apparatus for controlling the supply of power from a source to a motor connected to a load to move said load in one direction or the opposite direction comprising in combination first control means connected to said source and said motor for determining the speed and torque of said motor in said one direction in accordance with the setting of said first control means, second control means connected to said source and said motor for determining the torque and speed of said motor in accordance with the setting of said second control means, an inductor having an output and having a rotary component for determining said output, means connecting said inductor to said first and second control means so that said output determines the setting of said first and second control means, a master switch having a handle, said switch being selectively connected electrically to said inductor for selecting the direction and mode of operation of said motor, and means mechanically connecting said handle to said rotary component so that the position of said handle determines the angular position of said rotary component at least over a part of the range of movement of said handle.

12. Apparatus for controlling the supply of power from a source to a motor connected to a load to move said load in one direction or the opposite direction comprising in combination first control means connected to said source and said motor for determining the speed and torque of said motor in said one direction in accordance with the setting of said first control means, second control means connected to said source and said motor for determining the torque and speed of said motor in accordance with the setting of said second control means, an inductor having an output and having a rotary component for determining said output, means connecting said inductor to said first and second control means so that said output determines the setting of said first and second control means, a master switch having a handle, said switch being selectively connected electrically to said first and second control means for setting said control means and selecting the direction and mode of operation of said motor, and means mechanically connecting said handle to said rotary component so that the position of said handle determines the angular position of said rotary component at least over a part of the range of movement of said handle.

13. Apparatus for controlling the supply of power from a source to a motor connected to a load to move said load in one direction or the opposite direction comprising in combination first control means connected to said source and said motor for determining the speed and torque of said motor in said one direction in accordance with the setting of said first control means, second control means connected to said source and said motor for determining the torque and speed of said motor in said opposite direction in accordance with the setting of said second control means, an inductor having an output and having a rotary component for determining said output, a master switch having a handle and having contacts closed by operation of said handle as said handle is moved over its range of movement, means mechanically connecting said handle to said rotary component so that the position of said handle determines the angular position of said rotary component at least over a part of said range of movement, and means including said contacts for connecting said inductor in electrical controlling relationship to said first and second control means so that said output of said inductor determines the setting of said first and second control means to select the direction and mode of operation of said motor.

14. Hoisting apparatus including a hoist motor having a rotor, resistance means connected in circuit with said rotor, means connected to said motor and selectively operable to set said motor in a hoisting or lowering position and having a neutral stand-by setting in which said motor is deenergized, said setting means also including at least a starting lowering setting in which said setting means starts said motor from rest and an advanced lowering setting in which said setting means sets said motor for movement after said motor has started, means connected to said resistance means to be actuated for reducing the resistance of said resistance means, means connected to said reducing means to be actuated when said selectively actuable means is only in said stand-by setting, said hoisting setting and said starting lowering setting for preventing actuation of said reducing means, and means responsive to the current conducted by said resistance means and connected to said preventing actuable means for holding said preventing actuable means in preventing condition so long as said current is above a predetermined magnitude.

15. Hoisting apparatus including a hoist motor having a rotor, resistance means connected in circuit with said rotor, means connected to said motor and selectively operable to set said motor in a hoisting or lowering position and having a neutral stand-by setting in which said motor is deenergized, said setting means also including at least a starting lowering setting in which said setting means starts said motor from rest and an advanced lowering setting in which said setting means sets said motor for movement after said motor has started, means connected to said resistance means to be actuated for reducing the resistance of said resistance means, means connected to said reducing means to be actuated when said selectively actuable means is only in said stand-by setting, said hoisting setting and said starting lowering setting for preventing actuation of said reducing means, means actuable by said selectively operable means only when in lowering position and connected to said preventing actuable means for conditioning said preventing actuable means to return to a non-actuated condition, and holding means responsive to the current conducted by said resistance means and connected to said preventing actuable means for holding said preventing actuable means in preventing condition in spite of the conditioning of said preventing actuable means so long as said current is above a predetermined magnitude.

16. Apparatus for controlling the supply of power from a source to a motor comprising control means interposed in controlling relationship between said source and said motor, said control means, including means capable of being set in a first setting in which said motor has a first operation and in a second setting in which said motor has a second operation discretely different from said first operation, and said control means also being capable of being set in a continuum of settings between said first and second settings in which said motor has different operations which vary continuously between said first operation and said second operation as said control means is set over said continuum between said first and second settings, a master switch combination including a plurality of relatively movable contact means and a handle connected to said contact means, said handle having at least first and second positions respectively, for setting said movable contact means selectively in at least a first position and in a second position, said switch combination also including an inductor having cooperatively associated a rotor and a stator, and mechanical connection between said rotor and handle for rotating said rotor over at least a portion of the range of movement of said handle between said first position and said second position of said handle and for setting said rotor in different intermediate positions between the positions corresponding to said first and second positions of said handle, means connecting said contact means to said control means so that when said contact means is in said first position said control means is set in said first setting and when said contact means is in said second position said control means is in said second setting, and means connecting said inductor to said control means so that as said rotor is rotated by said handle between said first position and said second postition of said handle and is set in said intermediate positions said control means is set in different controlling settings over said continuum varying continuously between said first setting and said second setting.

17. Apparatus for controlling the supply of power from a source to a motor comprising control means interposed in controlling relationship between said source and said motor, said control means, including means capable of being set in a first setting in which said motor has a first operation and in a second setting in which said motor has a second operation discretely different from said first operation, and said control means also being capable of being set in a continuum of settings between said first and second settings in which said motor has different operations which vary continuously between said first operation and said second operation as said control means is set over said continuum between said first and second settings, a master switch combination including a plurality of relatively movable contact means and a handle connected to said contact means, said handle having at least first and second positions respectively, for setting said movable contact means selectively in at least a first position and in a second position, said switch combination also including a pair of magnetically related members, one member being movable relative to the other, and mechanical connection between said movable member and handle for moving said movable member over at least a portion of the range of movement of said handle between said first position and said second position of said handle and for setting said movable member in intermediate positions between the positions corresponding to said first and second positions of said handle means connecting said contact means to said control means so that when said contact means is in said first position said control means is set in said first setting and when said contact means is in said second position said control means is in said second setting, and means connecting one of said inductors to said control means so that as said movable member is moved by said handle between said first and second positions of said handle and is set in said intermediate positions said control means is set in different controlling settings over said continuum varying continuously between said first setting and said second setting.

References Cited in the file of this patent

UNITED STATES PATENTS

| | | |
|---|---|---|
| 1,503,156 | Hall | July 29, 1924 |
| 2,165,491 | Leitch | July 11, 1939 |
| 2,409,264 | Fledhausen | Oct. 15, 1946 |
| 2,712,105 | Mathias | June 28, 1955 |
| 2,719,255 | Behr et al. | Sept. 27, 1955 |
| 2,832,024 | Wickerham | Apr. 22, 1958 |